United States Patent [19]

Matida et al.

[11] Patent Number: 5,398,324
[45] Date of Patent: Mar. 14, 1995

[54] SYTEM FOR EFFICIENTLY STORING SAME DATA IN DUPLEX STORAGE BY USING SINGLE STORAGE CONTROLLER

[75] Inventors: Naoki Matida, Gunma; Atsuki Muramatsu, Tokyo, both of Japan

[73] Assignee: NEC Corporation, Tokyo, Japan

[21] Appl. No.: 898,661

[22] Filed: Jun. 15, 1992

[30] Foreign Application Priority Data

Jun. 14, 1991 [JP] Japan .................. 3-143424

[51] Int. Cl.$^6$ ............................................. G06F 12/02
[52] U.S. Cl. .................. 395/425; 364/DIG. 1; 364/238.3; 364/238.6; 364/239.7; 364/242.33
[58] Field of Search ... 364/200 MS File, 900 MS File; 395/400, 425

[56] References Cited

U.S. PATENT DOCUMENTS

| | | | |
|---|---|---|---|
| 4,428,044 | 1/1984 | Liron | 395/275 |
| 4,475,155 | 10/1984 | Oishi et al. | 395/275 |
| 4,896,266 | 1/1990 | Klashka et al. | 395/275 |
| 5,056,011 | 10/1991 | Yoshitake et al. | 395/425 |
| 5,185,877 | 2/1993 | Bissett et al. | 395/425 |
| 5,241,661 | 8/1993 | Concilio et al. | 395/425 |

*Primary Examiner*—Reba L. Elmore
*Assistant Examiner*—Hiep T. Nguyen
*Attorney, Agent, or Firm*—Foley & Lardner

[57] ABSTRACT

In a system for storing same data in first and second storages, a central controller for producing a duplex write control signal on a bus. An I/O processor processes the duplex write control signal received from the bus into first and second write control signals to deliver the first and the second write control signals to first and second DMA controllers connected to the first and the second storages. A request controller selects, as a first selected request, that one of first and second data transfer requests simultaneously produced by the first and the second DMA controllers in response to the first and the second write control signals. Supposing that the first selected request is the first data transfer request, a data buffer controller controls the first DMA controller in response to the first selected request to read the data from a main memory on the bus and to write the data in the first storage. Simultaneously, the data buffer controller makes a data buffer memory memorize the data. When the request controller subsequently selects the second data transfer request as a second selected request, the data buffer controller reads the data from the data buffer memory, and makes the second DMA controller write the data in the second storage.

4 Claims, 2 Drawing Sheets

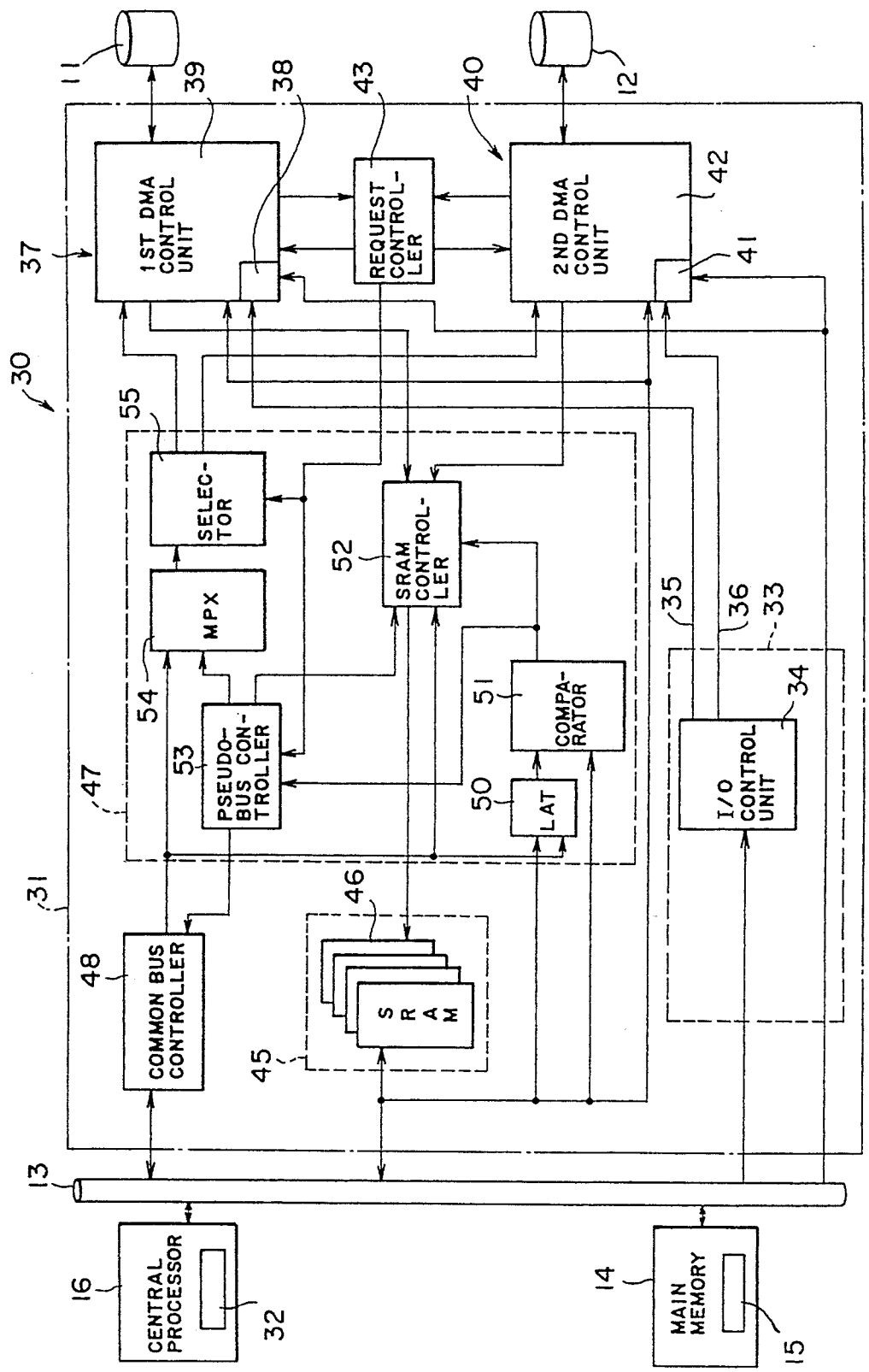
F I G. 2

SYTEM FOR EFFICIENTLY STORING SAME DATA IN DUPLEX STORAGE BY USING SINGLE STORAGE CONTROLLER

BACKGROUND OF THE INVENTION

This invention relates to an information processing system for use in combination with a duplex storage comprising first and second storages for storing same data.

In an information processing system of the type described, each of the first and the may be a magnetic disk storage, a magnetic tape storage or the like.

As will later be described in detail, a conventional information processing system comprises a bus and a main memory comprising a data area connected to the bus. The conventional information processing system further comprises a central processor connected to the bus, a first storage controller connected to the bus and to the first storage, and a second storage controller connected to the bus and to the second storage. When the central processor makes the first and the second storage controllers carry out data transfer from the data area of the main memory to the first and the second storages, the central processor produces, on the bus, a first write control signal indicative of data transfer from the main memory to the first storage at first. In response to the first write control signal received from the bus, the first storage controller carries out the data transfer from the data area of the main memory to the first storage through the bus. Thereafter, the central processor produces, on the bus, a second write control signal indicative of data transfer from the main memory to the second storage. In response to the second write control signal received from the bus, the second storage controller carries out the data transfer from the data area of the main memory to the second storage through the bus.

With this structure, the central processor is subjected to increased overhead, because the central processor produces the first and the second write control signals individually for the first and the second storage controllers. In addition, the bus is subjected to increased overhead. This is because the bus is used not only when the data transfer is carried out from the data area of the main memory to the first storage but also when the data transfer is carried out from the data area of the main memory to the second storage. Thus, the conventional information system is incapable of efficiently carrying out data transfer from the main memory to the duplex storage.

SUMMARY OF THE INVENTION

It is, therefore, an object of this invention to provide an information processing system which is capable of efficiently storing, same data in a duplex storage.

It is another object of this invention to provide an information processing system of the type described, which is capable of reducing overhead of a central processor on storing same data in the duplex storage.

It is still another object of this invention to provide an information processing system of the type described, which is capable of reducing the overhead of a bus on storing the same data in the duplex storage.

Other objects of this invention will become clear as the description proceeds.

According to this invention, there is provided an information processing system for use in combination with a duplex storage comprising a first and a second storage and which comprises: a bus; a main memory comprising a data area connected to the bus; a central processor comprising a control signal producer connected to the bus for producing a duplex write control signal indicative of data transfer from the data area to the first and the second storages and for delivering the duplex write control signal to the bus; and a duplex storage controller. The duplex storage controller comprises; an input-output controller connected to the bus for producing a first and a second write control signal in response to the duplex write control signal received from the bus, the first write control signal being indicative of data transfer from the data area to the first storage, the second write control signal being indicative of data transfer from the data area to the second storage, a first DMA controller comprising a first local memory connected to the input-output controller for memorizing the first write control signal as a first memorized write control signal and a first DMA control unit connected to the first storage, the bus, and the first local memory for producing a first data transfer request in response to the first memorized write control signal; a second DMA controller comprising a second local memory connected to the input-output controller for memorizing the second write control signal as a second memorized write control signal and a second DMA control unit connected to the second storage, the bus, and the second local memory for producing a second data transfer request in response to the second memorized write control signal; a request controller connected to the first and the second DMA control units for selecting a particular one of the first and the second data transfer requests as a first selected transfer request to produce the first selected transfer request and a particular unit signal representative of a particular one of the first and the second DMA control units that produces the first selected transfer request a data buffer memory connected to the bus; and a data buffer controller connected to the first and the second DMA control units for controlling the particular one of the first and the second DMA control units in response to the first selected transfer request and the particular unit signal to read data from the data area on the bus and to write the data in a particular one of the first and the second storages that is connected to the particular one of the first and the second DMA control units. The data buffer controller is furthermore connected to the data buffer memory for making the data buffer memory memorize the data produced on the bus. The particular one of the first and the second DMA control units is for producing an end signal representative of an end of the data transfer from the data area to the particular one of the first and the second storages. The request controller is for selecting, in response to the end signal, a different one of the first and the second data transfer requests as a second selected transfer request to produce the second selected transfer request and a different unit signal representative of a different one of the first and the second DMA control units that produces the second selected transfer request. The data buffer memory is furthermore connected to the first and the second DMA control units. The data buffer controller is for reading the data from the data buffer memory in response to the second selected transfer request and the different unit signal and for controlling the different one of the first and the second DMA control units in response to the second selected transfer request and the different unit signal to write the data in a different one of the first and the second storages that is connected to the different one of the first and the second DMA control units.

BRIEF DESCRIPTION OF THE DRAWING

FIG. 2 is a block diagram of an information processing system according to an embodiment of this invention.

DESCRIPTION OF THE PREFERRED EMBODIMENT

Figure 1:
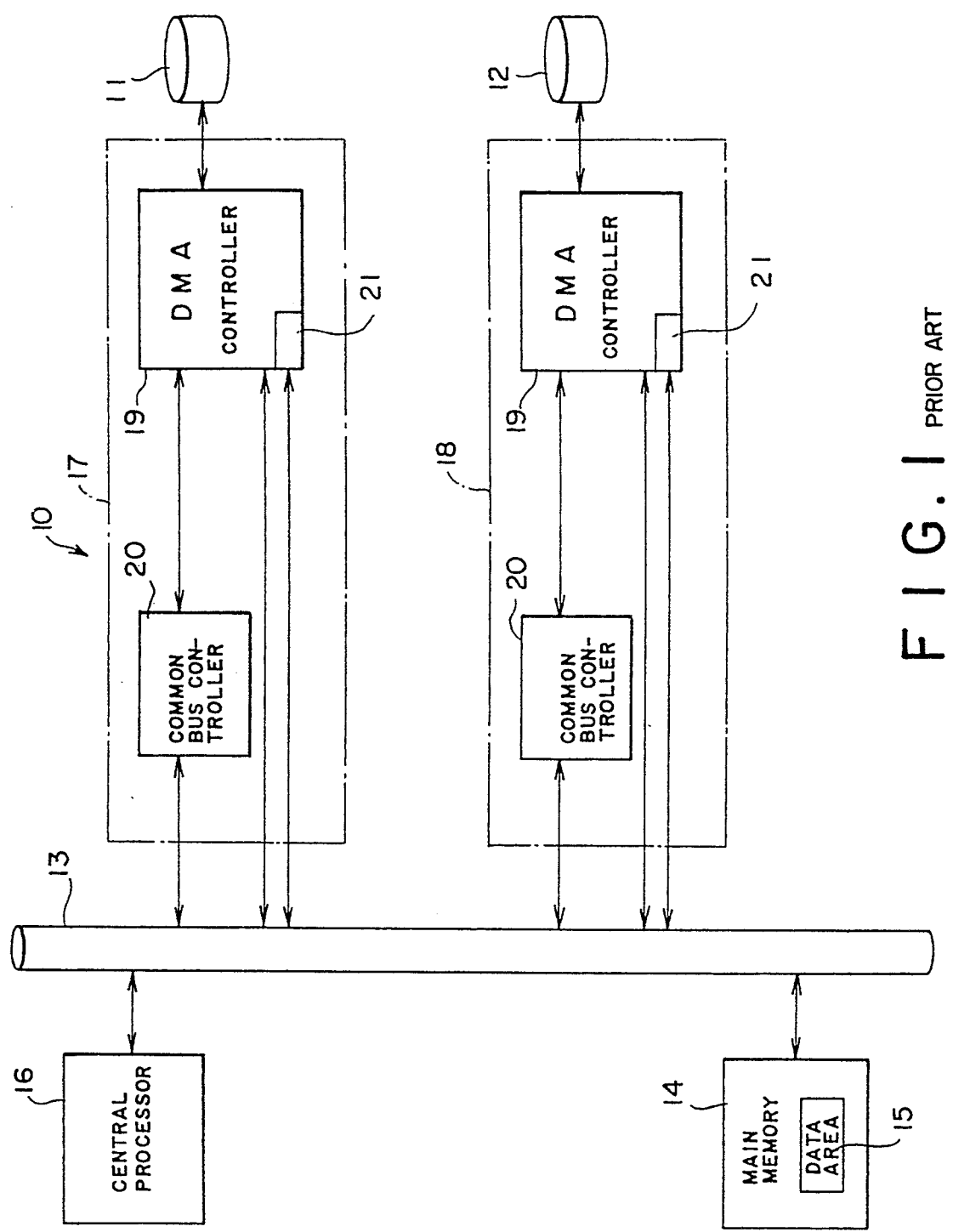
FIG. 1 is a block diagram of a conventional information processing system.

Referring to FIG. 1, a conventional information processing system 10 will first be described for a better understanding of this invention. The conventional information processing system 10 is equivalent to an information processing system which is described in the preamble of the instant specification.

As described in the preamble of the instant specification, the conventional information processing system 10 is for use in combination with a duplex storage comprising first and second storages 11 and 12. The information processing system 10 is for storing same data in the first and the second storages 11 and 12. Each of the first and the second storages 11 and 12 is typically a magnetic disk storage. Other storage of, for example, a magnetic tape storage may be used as each of the first and the second storages 11 and 12.

The information processing system 10 comprises a common bus 13 and a main memory 14 comprising a data area 15 connected to the common bus 13. The information processing system 10 further comprises a central processor 16 connected to the common bus 13, a first storage controller 17 connected to the common bus 13 and to the first storage 11, and a second storage controller 18 connected to the common bus 13 and to the second storage 12. Each of the first and the second storage controllers 17 and 18 includes a DMA (direct memory access) controller 19 and a common bus controller 20. Each of the DMA controllers 19 of the first and the second storage controllers 17 and 18 includes a local memory 21.

When the central processor 16 makes the first and the second storage controllers 17 and 18 carry out data transfer from the data area 15 of the main memory 14 to the first and the second storages 11 and 12, the central processor 16 first produces, a first write control signal on a common bus 13. The first write control signal has a first write control parameter indicative of data transfer from the main memory 14 to the first storage 11. In response to the first write control signal received from the common bus 13, the local memory 21 of the DMA controller 19 of the first storage controller 17 memorizes the first write control parameter as a memorized parameter and makes the common bus controller 20 of the first storage controller 17 acquire the common bus 13. When the common bus controller 20 acquires the common bus 13, the DMA controller 19 of the first storage controller 17 reads data from the data area 15 of the main memory 14 through the common bus 13 in accordance with the memorized parameter and writes the data in the first storage 11. When the writing operation of the data in the first storage 11 ends, the DMA controller 19 of the first storage controller 17 makes the common bus controller 20 of the first storage controller 17 release the common bus 23 from the DMA controller 19 of the first storage controller 17.

When the common bus 13 is released from the first storage controller 17, the central processor 16 produces, on the common bus 13, a second write control signal having a second write control parameter indicative of data transfer from the main memory 14 to the second storage 12. In response to the second write control signal received from the common bus 13, the second storage controller 18 carries out the data transfer from the data area 15 of the main memory 14 to the second storage 12 through the common bus 13, like the first storage controller 17.

With this structure, the central processor 18 is subjected to increased overhead as described in the preamble of the instant specification. This is because the central processor 16 produces the first and the second write control signals individually for the first and the second storage controllers 11 and 12. Inasmuch as the common bus 13 is used not only when the data transfer is carried out from the data area 15 of the main memory 14 to the first storage 11 but also when the data transfer is carried out from the data area 15 of the main memory 14 to the second storage 12, the common bus 13 is subjected to increased overhead as also described in the preamble of the instant specification.

Tuning to FIG. 2, an information processing system 30 according to a preferred embodiment of this invention comprises similar parts designated by like reference numerals. The information processing system 30 is for use in combination with the first and the second storages 11 and 12 and comprises a duplex storage controller 31 connected to the common bus 13 and to the first and the second storages 11 and 12.

The central processor 16 comprises a control signal producer 32 connected to the common bus 13. The control signal producer 32 produces, at first, a duplex write control signal having a duplex write control parameter indicative of data transfer from the data area 15 of the main memory 14 to the first and the second storages 11 and 12 and delivers the duplex write control signal to the common bus 13. Thereafter, the control signal producer 32 produces a data address signal having a data address parameter representative of a data address of the data area 15 of the main memory 14 and delivers the data address signal to the common bus 13.

The duplex storage controller 31 comprises an input-output (I/O) controller 33 connected to the common bus 13 and comprises an input-output (I/O) control unit 34. Responsive to the duplex write control signal received from the common bus 13, the input-output control unit 34 produces first and second write control signals 35 and 36. The first write control signal 35 has a first write control parameter indicative of data transfer from the data area 15 of the main memory 14 to the first storage 11. The second write control signal 36 has a second write control parameter indicative of data transfer from the data area 15 of the main memory 14 to the second storage 12. The input-output controller 33 produces, as it stands, the data address signal received from the common bus 13.

Thus, the input-output controller 33 produces, at first, the first and the second write control signals 35 and 36 in response to the duplex write control signal which is received from the common bus 13. Thereafter, the input-output processor 33 produces, as it is, the data address signal received from the common bus 13.

A first DMA (direct memory access) controller 37 comprises a first local memory 38 connected to the input-output controller 33. The first local memory memorizes the first write control signal 35 as a first memorized write control signal and the data address signal as a first memorized data address signal. The first DMA controller 37 further comprises a first DMA control unit 39 connected to the first local memory 38. The first DMA control unit 39 produces a first data transfer request in response to the first memorized write control signal.

A second DMA (direct memory access) controller 40 comprises a second local memory 41 connected to the input-output controller 33. The second local memory 41 memorizes the second write control signal 36 as a second memorized write control signal and the data address signal as a second memorized data address signal. The second DMA controller 40 further comprises a second DMA control unit 42 connected to the second local memory The second DMA control unit 42 produces a second data transfer request in response to the second memorized write control signal.

A request controller 43 is connected to the first and the second DMA control units 39 and 42. The request controller 43 selects a particular one of the first and the second data transfer requests as a first selected transfer request and produces the first selected data transfer request and a particular unit signal representative of a particular one of the first and the second DMA control units 39 and 42 that produces the first selected transfer request.

A data buffer memory 45 comprises an SRAM (static random access memory) 46 connected to the common bus 13. A common bus controller 48 is connected to the common bus 13.

A data buffer controller 47 is connected to the first and the second DMA control units 39 and 42 and to the common bus controller 48. The data buffer controller 47 makes the common bus controller 48 acquire the common bus 13 in response to the first selected request. After the common bus controller 48 acquires the common bus 13, the data buffer controller 47 controls the particular one of the first and the second DMA control units 39 and 42 in response to the first selected transfer request and the particular unit signal to read data from the data area 15 of the main memory 14 on the common bus 13 and to write the data in a particular one of the first and the second storages 11 and 12 that is connected to the particular one of the first and the second DMA control units 39 and 42. The data buffer controller 47 is furthermore connected to the SRAM 46 of the data buffer memory 45, and makes the SRAM 46 of the data buffer memory 45 memorize the data which are produced on the common bus 13.

The particular one of the first and the second DMA control units 39 and 42 produces an end signal representative of an end of the data transfer from the data area 15 of the main memory 14 to the particular one of the first and the second storages 11 and 12 when the data transfer from the data area 15 of the main memory 14 to the particular one of the first and the second storages 11 and 12 comes to an end.

The request controller 43 selects, in response to the end signal, a different one of the first and the second data transfer requests as a second selected transfer request and produces the second selected transfer request and a different unit signal representative of a different one of the first and the second DMA control units 39 and 42 that produces the second selected transfer request.

The SRAM 46 of the data buffer memory 45 is furthermore connected to the first and the second DMA control units 39 and 42.

The data buffer controller 47 makes the common bus controller 48 release the common bus 13 in response to the second selected transfer request. The data buffer controller 47 reads the data from the SRAM 46 of the data buffer memory 45 in response to the second selected transfer request and the different unit signal, and controls the different one of the first and the second DMA control units 39 and 42 in response to the second selected transfer request and the different unit signal, to write the data in a different one of the first and the second storages 11 and 12 connected to the different one of the first and the second DMA control units 39 and 42.

The duplex storage controller 31 will be described more in detail. When the request controller 43 selects the particular one of the first and the second data transfer requests as the first selected transfer request, the request controller 43 produces the first selected data transfer request and the particular unit signal representative of the particular one of the first and the second DMA control units 39 and 42 as described above. The first selected transfer request is produced by the particular one of the first and the second DMA control units 39 and 42, as also described above. In addition, the request controller 43 produces an acknowledgment signal and delivers the acknowledgment signal to the particular one of the first and the second DMA control units 39 and 42.

It will be assumed that the particular one of the first and the second DMA control units 39 and 42 is the first DMA control unit 39. In response to the acknowledgment signal, the first DMA control unit 39 reads the first memorized data address signal from the first local memory 38 as a first read-out data address signal. It will also be assumed that the first read-out data address signal represents the data address which is variable from a leading address of the data area 15 of the main memory 14 to a trailing address of the data area 15 of the main memory 14. The leading address is less than the trailing address.

In the data buffer controller 47, a latch unit 50 is labelled "LAT" and is connected to the common bus 13. The latch unit 50 preliminarily holds the leading address of the data area 15 of the main memory 14 as a held address. A comparator 51 is connected to the first and the second control units 39 and 42. The comparator 51 compares the data address of the first read-out data address signal with the held address equivalent to the leading address of the data area 15. In this case, the comparator 51 produces a compared result representing that the data address is not less than the held address. In a case where the data buffer controller 47 receives the first selected transfer request from the request controller 43, the comparator 51 inevitably produces the compared result representing that the data address is not less than the held address. When the compared result represents that the data address is not lees than the held address, a pseudo-bus controller 53 receives the first selected transfer request from the request controller 43 and gives the common bus controller 48 the first selected transfer request. When the common bus controller 48 acquires the common bus 13 in response to the first selected transfer request, the common bus controller 48 produces a bus state signal representative of a state of the common bus 13.

A multiplexer (MPX) 54 receives the bus state signal and delivers the bus state signal to a selector 55. The selector 55 also receives the particular unit signal representative of the particular one of the first and the second DMA control units 39 and 42 and gives the bus state signal to the particular one of the first and the second DMA control units 39 and 42 that is represented by the particular unit signal. Inasmuch as the particular one of the first and the second DMA control units 39 and 42 is the first DMA control unit 39, the first DMA control unit 39 receives the bus state signal.

In response to the bus state signal, the first DMA control unit 39 reads the data from the data area 15 of the main memory 14 on the common bus 13 and takes the data therein. Simultaneously, the common bus controller 48 delivers the bus state signal to an SRAM controller 52. Responsive to the bus state signal, the SRAM controller 52 delivers an SRAM write control signal to the SRAM 46 under control of the first DMA control unit 39 and writes in the SRAM 46 the data produced on the common bus 13. When all of the data of the data area 15 of the main memory 14 are written in the SRAM 46 through the common bus 13, the central processor 16 updates the latch unit 50 to make the latch unit 50 hold a leading address of a following data area as the held address. The following data area follows the data area 15 in the main memory 14. That is, the leading address of the following data area is greater than the trailing address of the data area 15.

The first DMA control unit 39 writes in the first storage 11 the data which the first DMA control unit 39 takes therein. When the first DMA control unit 39 writes all of the data in the first storage 11, the first DMA controller 39 produces the end signal.

In response to the end signal, the request controller 43 selects the different one of the first and the second data transfer requests as the second selected transfer request and produces the second selected transfer request and the different unit signal representative of the different one of the first and the second DMA control units 39 and 42 as described above. The second selected transfer request is produced by the different one of the first and the second DMA control units 39 and 42 as also described above. In addition, the request controller 43 produces the acknowledgment signal and delivers the acknowledgment signal to the different one of the first and the second DMA control units 39 and 42.

Inasmuch as the particular one of the first and the second DMA control units 39 and 42 is the first DMA control unit 39, the different one of the first and the second DMA control units 39 and 42 is the second DMA control unit 42. In response to the acknowledgment signal, the second DMA control unit 42 reads the second memorized data address signal from the second local memory 41 as a second read-out data address signal. Like the first read-out data signal, the second read-out data address signal represents the data address which is variable from the leading address of the data area 15 of the main memory 14 to the trailing address of the data area 15 of the main memory 14.

In the data buffer controller 47, the latch unit 50 holds the leading address of the following data area of the main memory 14 as the held address at present. The comparator 51 compares the data address of the second read-out data address signal with the held address equivalent to the leading address of the following data area. In this case, the comparator 51 produces a compared result representing that the data address is less than the held address. In a case where the data buffer controller 47 receives the second selected transfer request from the request controller 43, the comparator 51 necessarily produces the compared result representing that the data address is less than the held address.

When the compared result represents that the data address is less than the held address, the pseudo-bus controller 53 receives the second selected transfer request from the request controller 43 and gives a pseudo-bus state signal to the selector 55 through the multiplexer 54. The pseudo-bus controller 53 does not give the common bus controller 48 the second selected transfer request. In response to the different unit signal representative of the different one of the first and the second DMA control units 39 and 42, the selector 55 gives the pseudo-bus state signal to the different one of the first and the second DMA control units 39 and 42 that is represented by the different unit signal. Inasmuch as the different one of the first and the second DMA control units 39 and 42 is the second DMA control unit 42, the second DMA control unit 42 receives the pseudo-bus state signal.

In response to the pseudo-bus state signal which is received from the pseudo-bus controller 53, the SRAM controller 52 gives an SRAM read control signal to the SRAM 46 under control of the second DMA control unit 42 and read from the SRAM 46 the data which is delivered to the second DMA controller 42. The second DMA controller 42 writes the data in the second storage 12. Thus, the data transfer from the data area 15 to the first and the second storages 11 and 12 comes to an end.

Referring to FIG. 2, description will proceed to data transfer from the main memory 14 to one of the first and the second storages 11 and 12 when a failure occurs in another the other one of the first and the second storages 11 and 12. It will be assumed that a failure occurs in the first storage 11. In this case, the central processor 16 produces, at first, a simplex write control signal having a simplex write control parameter indicative of data transfer from the data area 15 of the main memory 14 to the second storage 12 and delivers the simplex write control signal to the common bus 13. Thereafter, the central processor 16 produces the data address signal having the data address parameter representative of the data address of the data area 15 of the main memory 14 and delivers the data address signal to the common bus 13.

Responsive to the simplex write control signal received from the common bus 13, the input-output control unit 34 produces the second write control signal 36. The second write control signal 36 has the second write control parameter indicative of data transfer from the data area 15 of the main memory 14 to the second storage 12. The input-output controller 33 produces, as it stands, the data address signal received from the common bus 13.

The second local memory 41 of the second DMA controller 40 memorizes the second write control signal 36 as the second memorized write control signal and the data address signal as the second memorized data address signal. The second DMA control unit 42 of the second DMA controller 40 produces the second data transfer request in response to the second memorized write control signal.

The request controller 43 selects the second data transfer request as a selected transfer request and produces the selected data transfer request and a unit signal representative of the second DMA control unit 42 which produces the selected transfer request.

The data buffer controller 47 makes the common bus controller 48 acquire the common bus 13 in response to the selected request. After the common bus controller 48 acquires the common bus 13, the data buffer controller 47 controls the second DMA control unit 42 in response to the selected transfer request and the unit signal to read data from the data area 15 of the main memory 14 on the common bus 13 and to write the data in the second storage 12. The data buffer controller 47 makes the SRAM 46 of the data buffer memory 45 memorize the data which are produced on the common bus 13.

The duplex storage controller 31 will be described more in detail. When the request controller 43 selects the second data transfer request as the selected transfer request, the request controller 43 produces the selected data transfer request and the unit signal representative of the second DMA control unit 42 as described above. In addition, the request controller 43 delivers the acknowledgment signal to the second DMA control unit 42.

In response to the acknowledgment signal, the second DMA control unit 42 reads the second memorized data address signal from the second local memory 41 as a second read-out data address signal. The second read-out data address signal represents the data address which variable from the leading address of the data area 15 of the main memory 14 to the trailing address of the data area 15 of the main memory 14.

In the data buffer controller 47, the latch unit 50 preliminarily holds the leading address of the data area 15 of the main memory 14 as the held address. The comparator 51 compares the data address of the second read-out data address signal with the held address equivalent to the leading address of the data area 15. In this case, the comparator 51 produces a compared result representing that the data address is not less than the held address. When the compared result represents that the data address is not less than the held address, the pseudo-bus controller 53 receives the selected transfer request from the request controller 43 and gives the common bus controller 48 the selected transfer request. When the common bus controller 48 acquires the common bus 13 in response to the selected transfer request, the common bus controller 48 produces the bus state signal.

The multiplexer (MPX) 54 receives the bus state signal and delivers the bus state signal to the selector 55. The selector 55 also receives the unit signal representative of the second DMA control unit 42 and gives the bus state signal to the second DMA control unit 42 that is represented by the unit signal. The second DMA control unit 42 receives the bus state signal.

In response to the bus state signal, the second DMA control unit 42 reads the data from the data area 15 of the main memory 14 on the common bus 13 and takes the data therein. Simultaneously, the common bus controller 48 delivers the bus state signal to the SRAM controller 52. Responsive to the bus state signal, the SRAM controller 52 delivers the SRAM write control signal to the SRAM 46 under control of the first DMA control unit 39 and writes in the SRAM 46 the data produced on the common bus 13. When all of the data of the data area 15 of the main memory 14 are written in the SRAM 46 through the common bus 13, the central processor 16 updates the latch unit 50 to make the latch unit 50 hold the leading address of the following data area as the held address. The following data area follows the data area 15 in the main memory 14.

The second DMA control unit 42 writes in the second storage 12 the data which the second DMA control unit 40 takes therein. When the second DMA control unit 42 writes all of the data in the second storage 12, the second DMA controller 42 produces the end signal.

With reference to FIG. 2 continued, the description will proceed to data transfer from one of the first and the second storages 11 and 12 to the data area 15 of the main memory 14. On carrying out data transfer from the first storage 11 to the data area 15 of the main memory 14, the central processor 16 produces, at first, a simplex read control signal having a simplex read control parameter indicative of data transfer from the first storage 11 to the main memory 14 and delivers the simplex read control signal to the common bus 13. Thereafter, the central processor 16 produces the data address signal having the data address of the data area 15 of the main memory 14 and delivers the data address signal to the common bus 13.

Responsive to the simplex read control signal received from the common bus 13, the input-output control unit 34 produces a first read control signal having a first read control parameter indicative of data transfer from the first storage 11 to the data area 15 of the main memory 14. The input-output controller 33 produces, as it stands, the data address signal received from the common bus 13.

The first local memory 38 memorizes the first read control signal as a first memorized read control signal and the data address signal as the memorized data address signal. In response to the first memorized read control signal, the first DMA control unit 39 reads data from the first storage 11 and supplies the first data transfer request to the request controller 43.

The request controller 43 selects the first data transfer request as the selected transfer request and produces the selected transfer request and the unit signal representative of the first DMA control unit 39 which produces the selected transfer request. The request controller 43 delivers the selected transfer request and the unit signal to the data buffer controller 47. The request controller 43 delivers the acknowledgment signal to the first DMA control unit 39 to make the first DMA control unit 39 read the memorized data address signal from the first local memory 38 as the first read-out data address signal. The data buffer controller 47 gives the selected transfer request to the common bus controller 48. The common bus controller 48 acquires the common bus 13 in response to the selected transfer request and produces the bus state signal. The bus state signal is delivered to the first DMA control unit 39 through the multiplexer 54 and the selector 55. When the first DMA control unit 39 receives the bus state signal, the first DMA control unit 39 delivers the data to the common bus 13 and writes the data in the data area 15 of the main memory 14 that has an address represented by read-out data address signal.

What is claimed is:

1. An information processing system for use in combination with a duplex storage having first and a second storages, the information processing system comprising:
a bus;

a main memory, including a data area, connected to said bus;

a central processor including a control signal producer connected to said bus for producing a duplex write control signal indicative of data transfer from said data area to said first and said second storages and for delivering said duplex write control signal to said bus; and a duplex storage controller including:

an input-output controller connected to said bus for producing a first and a second write control signal in response to said duplex write control signal received from said bus, said first write control signal being indicative of data transfer from said data area to said first storage, and said second write control signal being indicative of data transfer from said data area to said second storage;

a first DMA controller including a first local memory connected to said input-output controller for memorizing said first write control signal as a first memorized write control signal and a first DMA control unit connected to said first storage, said bus and said first local memory for producing a first data transfer request in response to said first memorized write control signal;

a second DMA controller including a second local memory connected to said input-output controller for memorizing said second write control signal as a second memorized write control signal and a second DMA control unit connected to said second storage, said bus and said second local memory for producing a second data transfer request in response to said second memorized write control signal;

a request controller connected to said first and said second DMA control units for selecting a particular one of said first and said second data transfer requests as a first selected transfer request to produce said first selected transfer request and a particular unit signal representative of a particular one of a said first and said second DMA control units that produces said first selected transfer request;

a data buffer memory connected to said bus; and a data buffer controller connected to said first and said second DMA control units for controlling said particular one of said first and said second DMA control units in response to said first selected transfer request and said particular unit signal to read data from said data area on said bus and to write said data in a particular one of said first and said second storages connected to said particular one of said first and said second DMA control units, said data buffer controller connected to said data buffer memory for making said data buffer memory memorize said data produced on said bus;

said particular one of said first and said second DMA control units producing an end signal representative of an end of the data transfer from said data area to said particular one of said first and said second storages;

said request controller selecting, in response to said end signal, a different one of said first and said second data transfer requests as a second selected transfer request to produce said second selected transfer request and a different unit signal representative of a different one of said first and said second DMA control units that produces said second selected transfer request;

said data buffer memory connected to said first and said second DMA control units;

said data buffer controller reading said data from said data buffer memory in response to said second selected transfer request and said different unit signal and controlling said different one of said first and said second DMA control units in response to said second selected transfer request and said different unit signal to write said data in a different one of said first and said second storages connected to said different one of said first and said second DMA control units.

2. An information processing system as claimed in claim 1, wherein:

said duplex storage controller further comprises a bus controller connected to said bus;

said data buffer controller being connected to said bus controller for making said bus controller acquire said bus in response to said first selected request;

said data buffer controller controlling, after said bus controller acquires said bus, said particular one of said first and said second DMA control units in response to said first selected transfer request and said particular unit signal to read data from said data area on said bus and to write said data in a particular one of said first and said second storages that is connected to said particular one of said first and said second DMA control units; and said dada buffer controller making said bus controller release said bus in response to said second selected request.

3. A duplex storage controller for an information processing system, the processing system comprising:

a duplex storage including a first and a second storage:

a bus;

a main memory including a data area connected to said bus; and a central processor including a control signal producer connected to said bus for producing a duplex write control signal indicative of data transfer from said data area to said first and said second storages and for delivering said duplex write control signal to said bus;

said duplex storage controller comprising:

an input-output controller connected to said bus for producing a first and a second write control signal in response to said duplex write control signal received from said bus, said first write control signal being indicative of data transfer from said data area to said first storage, and said second write control signal being indicative of data transfer from said data area to said second storage;

a first DMA controller including a first local memory connected to said input-output controller for memorizing said first write control signal as a first memorized write control signal and a first DMA control unit connected to said first storage, said bus, and said first local memory for producing a first data transfer request in response to said first write control signal;

a second DMA controller comprising a second local memory connected to said input-output controller for memorizing said second write control signal as a second memorized write control signal and a second DMA control unit connected to said second storage, said bus, and said second local memory for producing a second data transfer request in response to said second memorized write control signal;

a request controller connected to said first and said second DMA control units for selecting a particular one of said first and said second data transfer requests as a first selected transfer request to produce said first selected transfer request and a particular unit signal representative of a particular one of said first and said second DMA control units that produces said first selected transfer request;

a data buffer memory connected to said bus; and a data buffer controller connected to said first and said second DMA control units for controlling said particular one of said first and said second DMA control units in response to said first selected transfer request and said particular unit signal to read data from said data area on said bus and to write said data in a particular one of said first and said second storages that is connected to said particular one of said first and said second DMA control units, said data buffer controller being furthermore connected to said data buffer memory for making said data buffer memory memorize said data produced on said bus, said particular one of said first and said second DMA control units producing an end signal representative of an end of the data transfer from said data area to said particular one of said first and said second storages;

said request controller selecting, in response to said end signal, a different one of said first and said second data transfer requests as a second selected transfer request and a different unit signal representative of a different one of said first and said second DMA control units that produces said second selected transfer request;

said data buffer memory connected to said first and said second DMA control units; and said data buffer controller reading said data from said data buffer memory in response to said second selected transfer request and said different unit signal and for controlling said different one of said first and said second DMA control units in response to said second selected transfer request and said different unit signal to write said data in a different one of said first and said second storages that is connected to said different one of said first and said second DMA control units.

4. A duplex storage controller as claimed in claim 3, wherein:

said duplex storage controller further comprises a bus controller connected to said bus;

said data buffer controller being connected to said bus controller for making said bus controller acquire said bus in response to said first selected request;

said data buffer controller being for controlling, after said bus controller acquires said bus, said particular one of said first and said second DMA control units in response to said first selected transfer request and said particular unit signal to read data from said data area on said bus and to write said data in a particular one of said first and said second storages that is connected to said particular one of said first and said second DMA control units; and said data buffer controller being for making said bus controller release said bus in response to said second selected request.

* * * * *